United States Patent
Utsunomiya

(10) Patent No.: US 12,027,148 B2
(45) Date of Patent: Jul. 2, 2024

(54) SOUNDPROOF MATERIAL

(71) Applicant: Tangent Co., Ltd., Matsuyama Ehime (JP)

(72) Inventor: Takashi Utsunomiya, Matsuyama Ehime (JP)

(73) Assignee: Tangent Co., Ltd., Matsuyama Ehime (JP)

( * ) Notice: Subject to any disclaimer, the term of this patent is extended or adjusted under 35 U.S.C. 154(b) by 494 days.

(21) Appl. No.: 17/472,594

(22) Filed: Sep. 11, 2021

(65) Prior Publication Data

US 2021/0407489 A1 Dec. 30, 2021

Related U.S. Application Data

(63) Continuation-in-part of application No. PCT/JP2020/005527, filed on Feb. 13, 2020.

(30) Foreign Application Priority Data

Mar. 11, 2019 (JP) .................................. 2019-043314

(51) Int. Cl.
  *G10K 11/168* (2006.01)
  *B32B 7/025* (2019.01)
  *B32B 25/20* (2006.01)

(52) U.S. Cl.
  CPC ............ *G10K 11/168* (2013.01); *B32B 7/025* (2019.01); *B32B 25/20* (2013.01); *B32B 2250/05* (2013.01);
  (Continued)

(58) Field of Classification Search
  CPC .............. G10K 11/168; B60R 13/0815; B32B 15/046; B32B 15/06; B32B 15/18;
  (Continued)

(56) References Cited

U.S. PATENT DOCUMENTS

| | | | | | |
|---|---|---|---|---|---|
| 5,039,656 | A | * | 8/1991 | Hidaka | H10N 69/00 505/700 |
| 5,284,692 | A | * | 2/1994 | Bell | B32B 7/025 428/68 |
| 5,757,056 | A | * | 5/1998 | Chui | B82Y 10/00 257/295 |
| 2017/0057618 | A1 | * | 3/2017 | Khozikov | B64D 29/00 |
| 2019/0330914 | A1 | | 10/2019 | Utsunomiya | |

FOREIGN PATENT DOCUMENTS

| CN | 110418916 A | 11/2019 |
|---|---|---|
| JP | H06-17579 A | 1/1994 |

(Continued)

OTHER PUBLICATIONS

Applicant brings to the attention of the Examiner the existence of possibly related U.S. Appl. No. 16/507,074, filed Jul. 10, 2019 and published as US 2019 0330914 A1 on Oct. 31, 2019 and issued as U.S. Pat. No. 10,934,767 B2 on Mar. 2, 2021, which was a continuation-in-part of Intl App No. PCT/JP2017/044669 filed on Dec. 13, 2017 and published as WO 2018 131369 A1 on Jul. 19, 2018, and which has overlapping inventorship/ownership with the present case.

(Continued)

*Primary Examiner* — Alicia J Weydemeyer
(74) *Attorney, Agent, or Firm* — JTT Patent Services, LLC; Gerald T. Peters

(57) ABSTRACT

A soundproof material may comprise, in order: a first electrically conductive ferromagnetic layer, a charged insulator layer, and a second electrically conductive ferromagnetic layer. A charged site at the charged insulator layer may be electrically insulated from the first electrically conductive ferromagnetic layer and/or the second electrically conductive ferromagnetic layer. When a sound causes vibration of any among the first electrically conductive ferromagnetic layer, the charged insulator layer, and/or the second electri- (Continued)

cally conductive ferromagnetic layer, this causes alteration of a magnetic field at the first electrically conductive ferromagnetic layer and/or the second electrically conductive ferromagnetic layer, soundproofing being carried out when acoustic energy of the sound wave is lost as thermal energy.

20 Claims, 4 Drawing Sheets

(52) U.S. Cl.
CPC .................. *B32B 2307/102* (2013.01); *B32B 2307/202* (2013.01); *B32B 2307/206* (2013.01); *B32B 2307/208* (2013.01)

(58) Field of Classification Search
CPC ............ B32B 2250/05; B32B 2250/40; B32B 2255/10; B32B 2255/205; B32B 2266/12; B32B 2307/102; B32B 2307/202; B32B 2307/206; B32B 2307/208; B32B 2307/212; B32B 2307/304; B32B 25/08; B32B 25/20; B32B 2571/00; B32B 27/065; B32B 27/281; B32B 3/02; B32B 3/30; B32B 5/18; B32B 7/025
See application file for complete search history.

(56) References Cited

FOREIGN PATENT DOCUMENTS

| | | |
|---|---|---|
| JP | 2004-11705 A | 1/2004 |
| JP | 2004-323317 A | 11/2004 |
| JP | 2014-112204 A | 6/2014 |
| JP | 2018-112213 A | 7/2018 |
| JP | 2018-131013 A | 8/2018 |
| WO | 2018 131369 A1 | 7/2018 |

OTHER PUBLICATIONS

International Search Report (ISR) and/or Written Opinion (WrOp), all apparently dated Feb. 6, 2018, in PCT/JP2017/044669, filed Dec. 13, 2017 and entitled "Vacuum Insulating Material and Vacuum Insulating Glass", of which possibly related U.S. Appl. No. 16/507,074 was a bypass continuation-in-part. Submitted additionally for US Pat Cite No. 1.
International Preliminary Report on Patentability (IPRP) and/or Written Opinion (WrOp), all apparently dated Jul. 16, 2019, in PCT/JP2017/044669, filed Dec. 13, 2017 and entitled "Vacuum Insulating Material and Vacuum Insulating Glass", of which possibly related U.S. Appl. No. 16/507,074 was a bypass continuation-in-part. Submitted additionally for US Pat Cite No. 1.

\* cited by examiner

SOUNDPROOF MATERIAL

CROSS-REFERENCE TO RELATED APPLICATION, BENEFIT AND PRIORITY CLAIMS, AND INCORPORATION BY REFERENCE

This application is a continuation-in-part of and claims benefit under 35 USC 120 and 365(c) to copending International Application No PCT/JP2020/005527, entitled "Soundproof Material", filed 13 Feb. 2020; and further claims benefit of priority under 35 USC 119(a)-(d) to Japanese Patent Application No 2019-043314, entitled "Soundproof Material", filed 11 Mar. 2019, the contents of both of which applications are incorporated herein in their entireties by reference.

FIELD OF THE INVENTION

The present invention relates to a soundproof material.

BACKGROUND

Soundproof materials may include sound-blocking materials (concrete, iron sheeting, and so forth) that block sound by reflecting sound waves so as to prevent sound from being transmitted therethrough, and sound-absorbing materials (glass wool, urethane foam, and so forth) that attenuate sound wave energy by causing acoustic energy to be converted to thermal energy as a result of friction.

Because sound-blocking capability depends in principle on surface density (mass law), attempts to increase sound-blocking capability typically cause increase in the size and weight of the soundproof material.

The soundproofing capability achievable through sound absorption has also typically left something to be desired.

There is therefore a need for a soundproof material such as will permit achievement of improved soundproofing functionality.

It would also be desirable if such a soundproof material could provide improved soundproofing functionality in combination with thermal insulation functionality.

SUMMARY OF INVENTION

A soundproof material associated with the one embodiment of the present invention may comprise a first electrically conductive ferromagnetic layer, a charged insulator layer, and a second electrically conductive ferromagnetic layer which are disposed in this order. A charged site at the charged insulator layer may be electrically insulated from the first electrically conductive ferromagnetic layer and/or the second electrically conductive ferromagnetic layer. Vibration, due to a sound wave, of any among the first electrically conductive ferromagnetic layer, the charged insulator layer, and/or the second electrically conductive ferromagnetic layer may cause alteration of a magnetic field at the first electrically conductive ferromagnetic layer and/or the second electrically conductive ferromagnetic layer, soundproofing being carried out when acoustic energy of the sound wave is lost as thermal energy.

In some embodiments, the charged insulator layer may be electrostatically and/or magnetically shielded by the first electrically conductive ferromagnetic layer and/or the second electrically conductive ferromagnetic layer. Except where otherwise clear from context, what is referred to herein as shielding may generally be understood to include shielding with respect to the exterior.

In some embodiments, a first gap layer may be formed between the first electrically conductive ferromagnetic layer and the charged insulator layer.

In some embodiments, a second gap layer may be formed between the charged insulator layer and the second electrically conductive ferromagnetic layer.

In some embodiments, the first electrically conductive ferromagnetic layer and the second electrically conductive ferromagnetic layer may be respectively capable of engaging in motion relative to the charged insulator layer.

Where a first gap layer is present, the first gap layer may comprise silicone in the form of silicone gel and/or silicone rubber, for example. Where a second gap layer is present, the second gap layer may comprise silicone in the form of silicone gel and/or silicone rubber, for example.

In some embodiments, the charged insulator layer may comprise a first charged insulator layer and/or a second charged insulator layer. Where a first charged insulator layer is present, the first charged insulator layer may be integral with the first electrically conductive ferromagnetic layer. Where a second charged insulator layer is present, the second charged insulator layer may be integral with the second electrically conductive ferromagnetic layer.

Where the charged insulator layer comprises a first charged insulator layer and a second charged insulator layer, the first charged insulator layer and the second charged insulator layer may be arranged in mutually opposed fashion so as to straddle therebetween a third gap layer. The third gap layer may be a vacuum layer. In some embodiments, a repulsive force which is a Coulomb force may act between the first charged insulator layer and the second charged insulator layer so as to balance ambient atmospheric pressure.

In some embodiments, a multiplicity of charged regions may be arrayed in regular and orderly fashion at the first charged insulator layer and/or the second charged insulator layer. The charged regions might, for example, be circular, elliptical, and/or regular polygonal. In one embodiment, the regular and orderly arrayal of charged regions might, for example, constitute a rectangular lattice-like arrangement, and the charged regions might, for example, each be substantially 4 mm in size at their widest dimension with a pitch of substantially 5 mm therebetween. In another embodiment, the regular and orderly arrayal of charged regions might, for example, constitute an equilateral-triangle-lattice-like arrangement or other such zigzagging pattern, and the charged regions might, for example, each be substantially 2 mm in size at their widest dimension with a pitch of substantially 2.5 mm therebetween.

In some embodiments, perimeter groove(s) may be formed on inner surface(s) at perimeter(s) of the first electrically conductive ferromagnetic layer and/or the second electrically conductive ferromagnetic layer so as to prevent physical contact with the first charged insulator layer and/or the second charged insulator layer.

Soundproof materials in accordance with embodiments of the present invention may be such that vibration of a sound wave causes alteration of a magnetic field at electrically conductive ferromagnetic layer(s) and causes energy of the sound wave to be lost as thermal energy, making it possible for the magnitude of the energy of the sound wave to be reduced and for soundproofing effect to be exhibited.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

EMBODIMENTS FOR CARRYING OUT INVENTION

Below, description is given with respect to embodiments of the present invention. At least one embodiment of the present invention is a soundproof material in which the magnetic field at an electrically conductive ferromagnetic layer is altered by sound waves, producing core losses (magnetic losses) comprising losses due to eddy currents and losses due to hysteresis, soundproofing being achieved due to the reduction in the magnitude of the acoustic energy which occurs as a result of its conversion to Joule heat (i.e., it is lost as thermal energy).

First Embodiment

Figure 1:
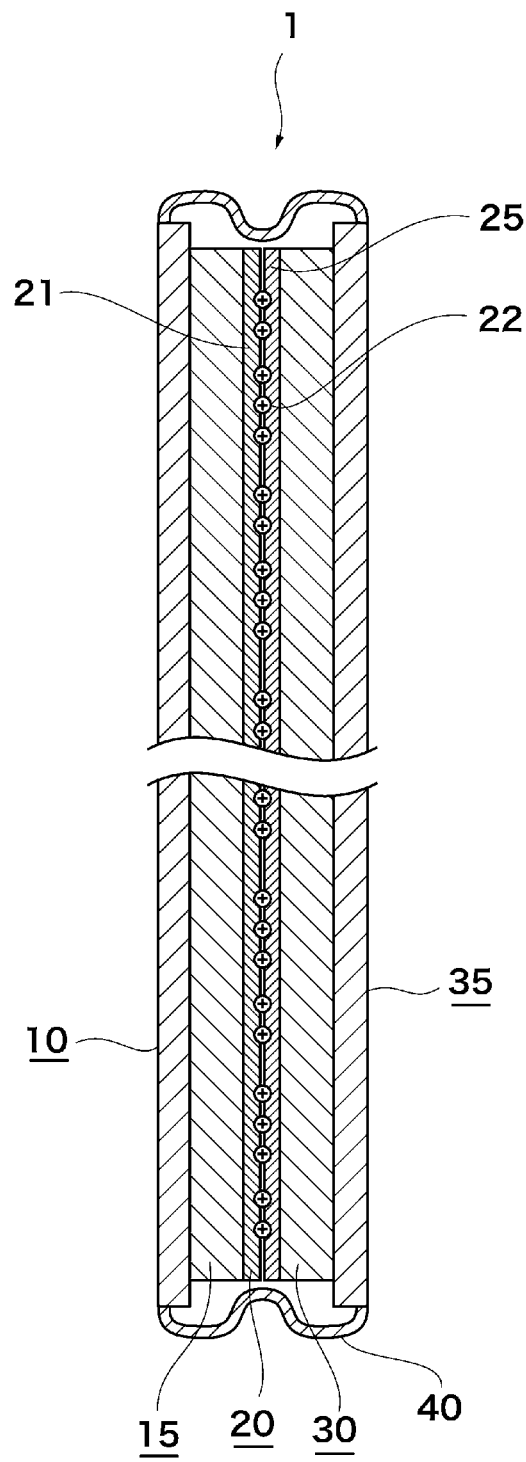
FIG. 1 is a sectional view of a soundproof material associated with a first embodiment of the present invention.
Figure 2:
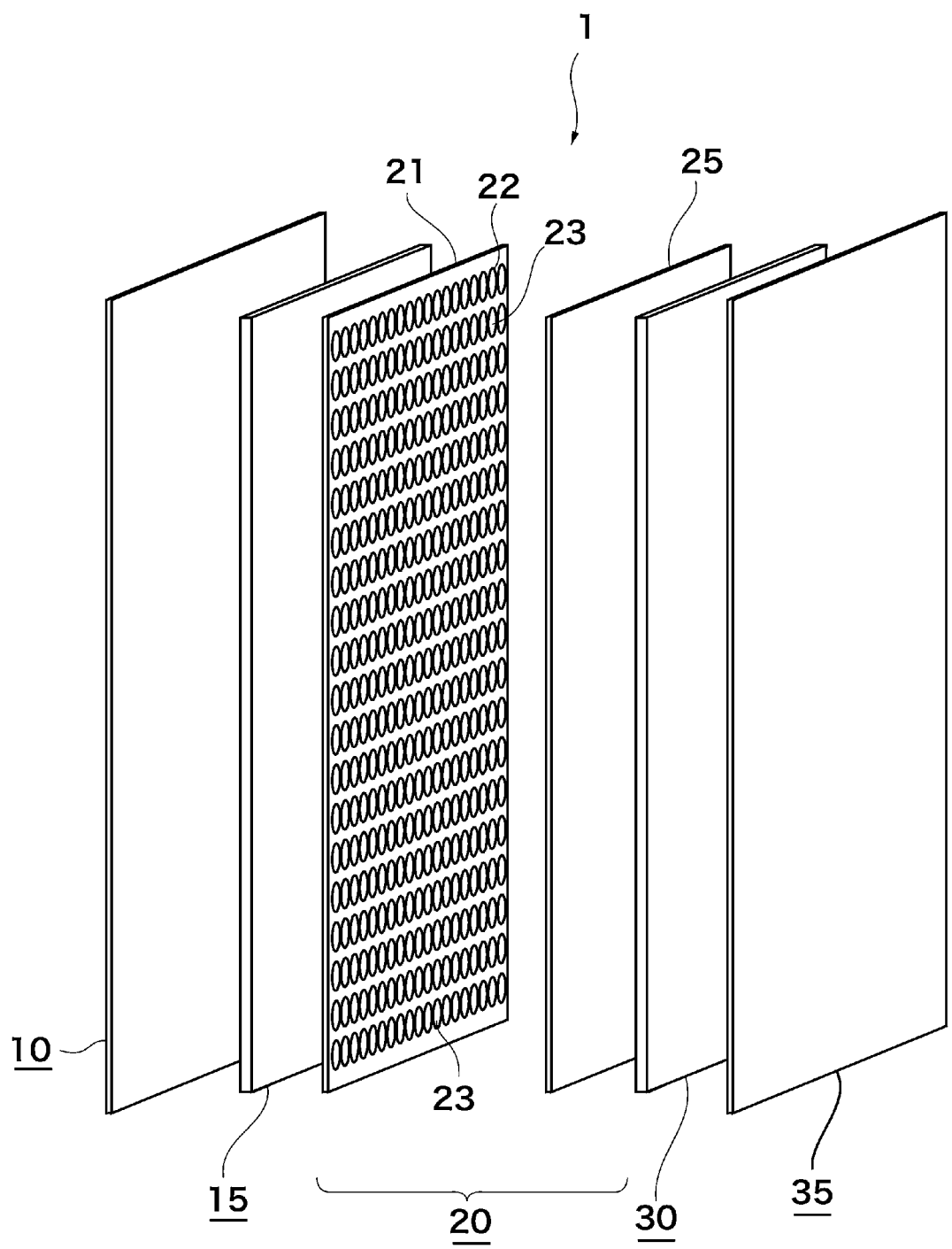
FIG. 2 is an exploded perspective view of the soundproof material associated with the first embodiment of the present invention.

Below, a first embodiment of the present invention is described with reference to FIG. 1 and FIG. 2. Provided at soundproof material 1 are first electrically conductive ferromagnetic layer 10, charged insulator layer 20, and second electrically conductive ferromagnetic layer 35 which are disposed in this order, and seal frame 40 which covers the perimeters thereof. At FIG. 2, note that seal frame 40 is not shown.

In accordance with the first embodiment, first electrically conductive ferromagnetic layer 10 and second electrically conductive ferromagnetic layer 35 respectively comprise sheet iron. Although sheet iron is employed at first electrically conductive ferromagnetic layer 10 and second electrically conductive ferromagnetic layer 35 of the first embodiment, any electrically conductive ferromagnetic plate-like material—e.g., nickel, ferrite, or other such suitable material—may be employed thereat.

Formed between first electrically conductive ferromagnetic layer 10 and charged insulator layer 20 is first gap layer 15. In accordance with the present embodiment, first gap layer 15 comprises silicone, being a silicone gel layer. Furthermore, in accordance with the present embodiment, first gap layer 15 may be sandwiched by and be in intimate contact with first electrically conductive ferromagnetic layer 10 and charged insulator layer 20. Due to presence of first gap layer 15, first electrically conductive ferromagnetic layer 10 and charged insulator layer 20 are made capable of engaging in relative vibration.

Although a silicone gel layer is employed as first gap layer 15 in accordance with the present embodiment, any other such suitable insulator material of high relative permittivity and having such flexibility as will allow first electrically conductive ferromagnetic layer 10 and charged insulator layer 20 to be capable of engaging in relative vibration may be employed as first gap layer 15. For example, in some embodiments, first gap layer 15 may be an air layer. Where high dielectric breakdown strength is preferred, it is preferred that a silicone rubber layer be employed as first gap layer 15.

Provided at charged insulator layer 20 are first insulator layer 21, first charged site 22, and second insulator layer 25, which are disposed in this order. First insulator layer 21 and second insulator layer 25 are thin and sheet-like in shape. In accordance with the present embodiment, first insulator layer 21 and second insulator layer 25 respectively comprise polyimide film or other such similar material preferably having high electrical resistance and good resistance to hot and cold temperatures. In accordance with one embodiment, first insulator layer 21 and second insulator layer 25 are respectively made up of Kapton (registered trademark) film, which is a polyimide film having good heat resistance and good cold resistance.

At first charged site 22, plating might, for example, be used to form a copper foil layer on the inner surface of first insulator layer 21, etching thereafter being carried out to remove a prescribed portion thereof so as to cause formation of a large number of circular copper foil portions in orderly rectangular lattice-like arrangement.

Then, with first electrically conductive ferromagnetic layer 10 serving as negative electrode, high voltage might respectively be applied by way of contact pins to these circular copper foil portions, upon disconnection of which a multiplicity of circular charged regions 23 that are positively charged will have been formed, resulting in formation of first charged site 22 on first insulator layer 21. In accordance with the present embodiment, the surface charge density σ of first charged site 22 might, for example, be $\sigma = 1.0 \times 10^{-4}$ [C/m$^2$].

By then causing second insulator layer 25 to be layered over first charged site 22 on first insulator layer 21, charged insulator layer 20 at which first charged site 22 is sandwiched between first insulator layer 21 and second insulator layer 25 is formed.

Formed between charged insulator layer 20 and second electrically conductive ferromagnetic layer 35, in similar fashion as with first gap layer 15, is second gap layer 30. In accordance with the present embodiment, second gap layer 30 comprises silicone, being a silicone gel layer. Furthermore, in accordance with the present embodiment, second gap layer 30 may be sandwiched by and be in intimate contact with charged insulator layer 20 and second electrically conductive ferromagnetic layer 35. As a result of formation of this second gap layer 30, charged insulator layer 20 and second electrically conductive ferromagnetic layer 35 are made capable of engaging in relative vibration. Although first gap layer 15 and second gap layer 30 have been described as comprising silicone gel, one or both of these may comprise silicone rubber and/or any other such soft, flexible, insulative material.

Seal frame 40 of the present embodiment is made up of electrically conductive wire mesh or sheet metal, and in integral fashion with electrically conductive ferromagnetic layers 10, 35, causes the interior and the exterior of soundproof material 1 to be electrostatically and magnetically shielded from each other.

As a result, the effect of the electric field arising due to the charge at first charged site 22 does not extend to the exterior of soundproof material 1, and the effect of the magnetic field arising due to first charged site 22 does not extend to the exterior of soundproof material 1. To satisfactorily achieve electrostatic shielding, note that it is preferred that soundproof material 1 be installed in such fashion that electrically conductive ferromagnetic layers 10, 35 are connected to ground.

Note that instead of separately installing a seal frame 40 it is also possible to bend the perimeter portions of electrically conductive ferromagnetic layers 10, 35 so as to achieve a constitution permitting electrostatic and magnetic shielding.

Exemplary dimensions of soundproof material 1 of the present embodiment will now be described. Soundproof material 1 might be plate-like, being 20 cm long and 10 cm wide, for example. First electrically conductive ferromagnetic layer 10 and second electrically conductive ferromagnetic layer 35 might each be 0.5 mm in thickness, first gap layer 15 and second gap layer 30 might each be 1 mm in thickness, and first insulator layer 21 and second insulator layer 25 might each be 75 μm in thickness. Furthermore, circular charged areas 23 at first charged site 22 might be formed in rectangular lattice-like arrangement with pitch 5 mm between circles of diameter 4 mm.

Exemplary action of soundproof material 1 will be described next. When a sound wave passes through soundproof material 1 constituted in such fashion, we might, for example, consider the case in which the compressional sound wave is incident on the soundproof material 1 from the left side thereof as seen in FIG. 1.

It should first be noted that a portion of the sound wave incident thereon will be reflected by the surface on which it is incident, and a portion thereof will be transmitted through first electrically conductive ferromagnetic layer 10. At such time, plate-like first electrically conductive ferromagnetic layer 10 will be made to vibrate in its thickness direction by the sound wave, such that it moves relative to first charged site 22. At first electrically conductive ferromagnetic layer 10, the magnetic field will therefore be altered, causing occurrence of core losses (losses due to eddy currents and losses due to hysteresis), as a result of which the energy of the sound wave will be lost as thermal energy, and the magnitude of the sound will be reduced.

Moreover, the sound wave which is transmitted through first electrically conductive ferromagnetic layer 10 arrives at charged insulator layer 20, and charged insulator layer 20 is made to vibrate in its thickness direction. As a result, at second electrically conductive ferromagnetic layer 35 and first electrically conductive ferromagnetic layer 10 which have been made to move relative to first charged site 22, the magnetic field will be altered, causing occurrence of core losses, as a result of which the magnitude of the sound wave energy will be reduced.

Furthermore, the sound wave which is transmitted through charged insulator layer 20 arrives at second electrically conductive ferromagnetic layer 35, and second electrically conductive ferromagnetic layer 35 is made to vibrate in its thickness direction. As a result, at second electrically conductive ferromagnetic layer 35 which has been made to move relative to first charged site 22, there will be occurrence of core losses, and the magnitude of the sound wave energy will be reduced.

Thus, when a sound wave passes through soundproof material 1, because absorption of sound and the like which occurs at electrically conductive ferromagnetic layers 10, 35 as a result of losses due to eddy currents and losses due to hysteresis causes the acoustic energy that is transmitted therethrough to the opposite side to be attenuated, soundproof material 1 exhibits a large soundproofing effect.

Here, the surface potential V [V] at first charged site 22 is given by $V = \sigma d / \varepsilon_0 \varepsilon_s$ (d=insulator thickness; $\varepsilon_0$=permittivity of vacuum; $\varepsilon_s$=relative permittivity of silicone gel). In accordance with the exemplary values given for the present embodiment, because at first charged site 22 the surface charge density $\sigma = 1.0 \times 10^{-4}$ [C/m$^2$] and d is 1.075 mm (insulator layers 21, 25 are 75 μm in thickness; gap layers 15, 30 are 1 mm in thickness), the average surface potential V=4049 [V].

Because a large surface charge density σ at first charged site 22 will cause increase in losses due to eddy currents and losses due to hysteresis, permitting increase in soundproofing capability, it is preferred from the standpoint of soundproofing capability that the surface potential V of first charged site 22 be made as high as possible within such range as will not result in occurrence of dielectric breakdown at gap layers 15, 30.

Next, an exemplary method for manufacturing soundproof material 1 of the present embodiment will be described. First, first insulator layer 21 and first gap layer 15 comprising a silicone gel layer are affixed to and laminated with first electrically conductive ferromagnetic layer 10. With this in this state, first charged site 22 is formed on the surface on one side of first insulator layer 21 as described above.

By then causing second insulator layer 25 to be layered over the face of first insulator layer 21 at which first charged site 22 was formed, charged insulator layer 20 having first charged site 22 which is electrically insulated at the interior thereof is formed.

Next, second gap layer 30 comprising a silicone gel layer and second electrically conductive ferromagnetic layer 35 are sequentially affixed to and laminated over the side of charged insulator layer 20 toward second insulator layer 25, and seal frame 40 is installed thereon to manufacture soundproof material 1.

As described above, soundproof material 1 associated with the first embodiment is such that vibration produced by a sound incident thereon alters the magnetic field at electrically conductive ferromagnetic layers 10, 35 and causes generation of core losses, as a result of which the vibration is converted into Joule heat, permitting achievement of a soundproofing functionality which causes reduction in the magnitude of the acoustic energy.

Second Embodiment

Figure 3:
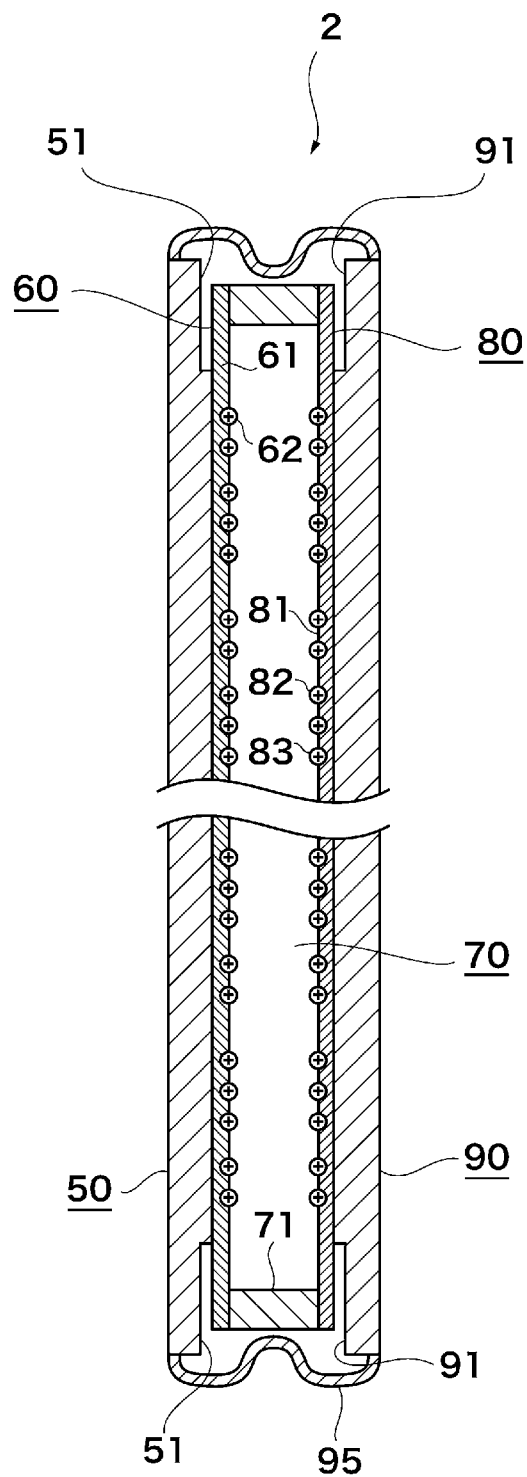
FIG. 3 is a sectional view of a soundproof thermal insulation material associated with a second embodiment of the present invention.
Figure 4:
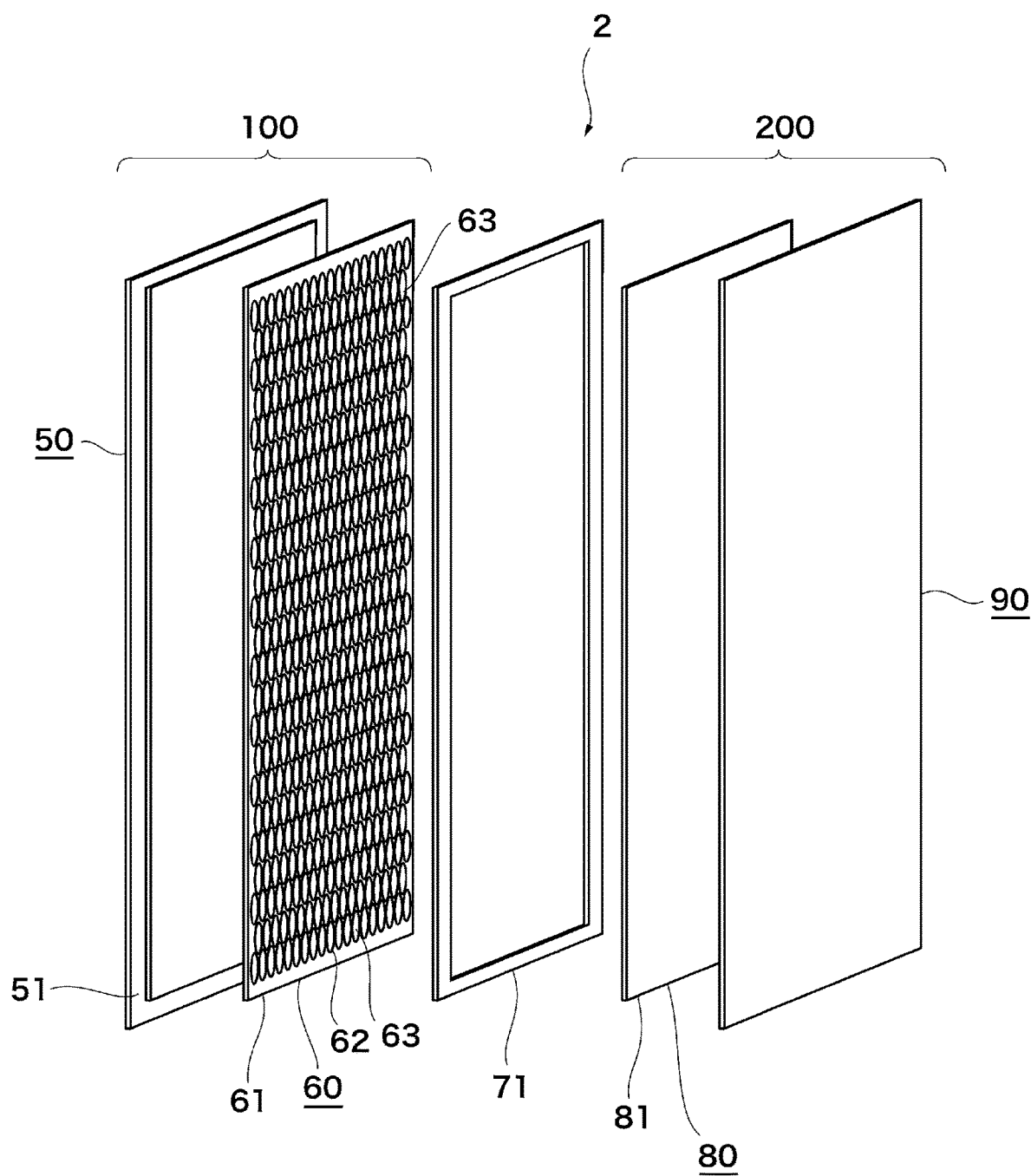
FIG. 4 is an exploded perspective view of the soundproof thermal insulation material associated with the second embodiment of the present invention.

Next, a second embodiment of the present invention is described with reference to FIG. 3 and FIG. 4. Described at the present embodiment is soundproof thermal insulation material 2 at which a vacuum layer is formed, permitting thermal insulation functionality to be provided by the present embodiment in addition to soundproofing functionality.

Provided at soundproof thermal insulation material 2 are first electrically conductive ferromagnetic layer 50, first charged insulator layer 60, second charged insulator layer 80, and second electrically conductive ferromagnetic layer 90, which are disposed in this order, and seal frame 95 which is installed at the perimeters of electrically conductive ferromagnetic layers 50, 90. At FIG. 4, note that seal frame 95 is not shown.

As was the case at the foregoing first embodiment, while first electrically conductive ferromagnetic layer 50 and second electrically conductive ferromagnetic layer 90 comprise sheet iron in the present embodiment, other material(s) may be employed thereat as appropriate.

First charged insulator layer 60 is formed by charging the surface of an insulator, first insulator layer 61 and first charged site 62 being provided thereat. In similar fashion as at the first embodiment, first insulator layer 61 may be made up of Kapton (registered trademark) film or other such similar material.

At first charged site 62, plating may be used to form a copper foil layer at the surface on one side of first insulator layer 61, etching thereafter being carried out to remove a prescribed portion thereof so as to cause formation of a large number of circular copper foil portions in orderly arrangement. With first electrically conductive ferromagnetic layer 50 serving as negative electrode, high voltage might respectively be applied by way of contact pins to these circular copper foil portions, upon disconnection of which a multiplicity of circular charged regions 63 that are positively charged will have been formed, resulting in formation of first charged site 62 at the surface on one side of first insulator layer 61.

Second charged insulator layer 80 may be constituted in the same fashion as first charged insulator layer 60, being provided with second insulator layer 81, and second charged site 82 (circular charged regions 83) formed at the surface on one side of second insulator layer 81. In accordance with the present embodiment, the surface charge density σ of charged sites 62, 82 might, for example, be $\sigma=2.5\times10^{-3}$ [C/m$^2$].

In accordance with the present embodiment, first charged insulator layer 60 and second charged insulator layer 80 are arranged in mutually opposed fashion so as to cause first charged site 62 and second charged site 82 to be in mutually facing orientation such that gap layer 70 comprising a vacuum layer is straddled therebetween. Gap layer 70 of the present embodiment is formed as a result of the fact that spacer frame 71 made of silicone rubber is installed between first charged insulator layer 60 and second charged insulator layer 80.

In accordance with the present embodiment, the inner surface of first electrically conductive ferromagnetic layer 50, and the outer surface of first charged insulator layer 60 at which first charged site 62 is not formed, are in intimate contact. Note, however, as shown in FIG. 3, that in accordance with the present embodiment the perimeter portion of first electrically conductive ferromagnetic layer 50 is made to be thin along the entire circumference thereof, perimeter groove 51 at which the inner surface of first electrically conductive ferromagnetic layer 50 is recessed being formed thereat so as to prevent interference with first charged insulator layer 60.

And with respect to second electrically conductive ferromagnetic layer 90 of the present embodiment as well, perimeter groove 91 at which the inner surface thereof is recessed is formed thereat so as to prevent interference with second charged insulator layer 80. As a result of formation of perimeter grooves 51, 91 and gap layer 70, first charged insulator layer 60 and second charged insulator layer 80 are made capable of engaging in relative vibration in the thickness direction.

Here, taking the combination of first electrically conductive ferromagnetic layer 50 and first charged insulator layer 60 which are in intimate contact and form an integral structure to be first plate 100, and taking the combination of second electrically conductive ferromagnetic layer 90 and second charged insulator layer 80 which are in intimate contact and form an integral structure to be second plate 200, because first plate 100 and second plate 200 are in mutually facing orientation such that a vacuum layer (gap layer 70) is straddled therebetween, atmospheric pressure will act thereon in a direction such as will tend to cause the two to be brought nearer together.

Furthermore, because first charged insulator layer 60 and second charged insulator layer 80 of the present embodiment are both charged so as to be the same polarity, each being positively charged, a repulsive force which is a Coulomb force will act between first plate 100 and second plate 200 in a direction such as will tend to cause these to be brought further apart.

The Coulomb force that would arise were uniformly charged infinitely large plane surfaces to be arranged in mutually opposed fashion is not dependent on the length of the gap between the planar plates but varies as a function of surface charge density. In contrast, where, as in the present embodiment, circular charged regions 63, 83 are arrayed in regular and orderly fashion, the Coulomb force that arises will depend on the length of the gap between first plate 100 and second plate 200 (the length of the gap between first charged insulator layer 60 and second charged insulator layer 80), a change in the gap length therebetween causing a change in the repulsive force that acts between the two. In accordance with the present embodiment, the relationship between the gap length and the repulsive force is such that an increase in gap length will cause the repulsive force to decrease in monotonic fashion.

Accordingly, when a change in atmospheric pressure occurs in the environment in which soundproof thermal insulation material 2 is installed, flexure of first plate 100 and second plate 200 toward the interior or the exterior in correspondence to the change in atmospheric pressure will produce a change in gap length and cause the repulsive Coulomb force to change in such fashion as to follow and maintain balance with the atmospheric pressure.

Because, as described above, in accordance with the present embodiment, perimeter grooves 51, 91 are formed on the inner surfaces at the perimeters of electrically conductive ferromagnetic layers 50, 90, such that the perimeter portions of charged insulator layers 60, 80 are not in intimate contact therewith, the perimeter portions of charged insulator layers 60, 80 readily deform, such that the following of changes in atmospheric pressure thereby can readily occur.

In similar fashion as at the first embodiment, seal frame 95 of the present embodiment is made up of electrically conductive wire mesh or sheet metal, and in integral fashion with electrically conductive ferromagnetic layers 50, 90, causes the interior and the exterior of soundproof thermal insulation material 2 to be electrostatically and magnetically shielded from each other. To satisfactorily achieve electrostatic shielding, note that it is preferred that soundproof thermal insulation material 2 be installed in such fashion that electrically conductive ferromagnetic layers 50, 90 are connected to ground.

Exemplary dimensions of soundproof thermal insulation material 2 of the present embodiment will now be described. Soundproof thermal insulation material 2 might be plate-like, being 20 cm long and 10 cm wide, for example. First electrically conductive ferromagnetic layer 50 and second electrically conductive ferromagnetic layer 90 might each be 0.5 mm in thickness, first insulator layer 61 and second insulator layer 81 might each be 50 µm in thickness, and gap layer 70 might be 0.8 mm in thickness. Furthermore, a multiplicity of circular charged regions 63, 83 might be formed in an orderly equilateral-triangle-lattice-like arrangement (a zigzagging pattern) with pitch 2.5 mm between circles of diameter 2 mm.

Exemplary action of soundproof thermal insulation material 2 will be described next. In similar fashion as at the first embodiment, let us consider the case in which a sound wave is incident on the soundproof thermal insulation material 2 from the left side thereof as seen in FIG. 3. In accordance with the present embodiment as well, the sound wave incident on soundproof thermal insulation material 2 will cause first plate 100 (first electrically conductive ferromagnetic layer 50 and first charged insulator layer 60) and second plate 200 (second electrically conductive ferromagnetic layer 90 and second charged insulator layer 80) to vibrate in the thickness direction.

This being the case, in similar fashion as at the first embodiment, at first electrically conductive ferromagnetic layer 50 and second electrically conductive ferromagnetic layer 90, the magnetic field will be altered, causing occurrence of core losses (losses due to eddy currents and losses due to hysteresis), as a result of which the energy of the sound wave will be lost as thermal energy.

Thus, when a sound wave passes through soundproof thermal insulation material 2, generation of Joule heat at electrically conductive ferromagnetic layers 50, 90 causes reduction in the magnitude of the acoustic energy and makes it possible for soundproof thermal insulation material 2 to exhibit a large soundproofing effect.

Here, at charged sites 62, 82 in accordance with the second embodiment, since surface potential $V=\sigma d/\varepsilon_0 \varepsilon_s$ (d=insulator thickness; $\varepsilon_0$=permittivity of vacuum; $\varepsilon_s$=relative permittivity of Kapton (registered trademark)), because, in accordance with the exemplary values given for the present embodiment, at charged sites 62, 82 the surface charge density $\sigma=2.5\times10^{-3}$ [C/m$^2$] and d is 0.050 mm (insulator layers 61, 81 are 50 µm in thickness), the average surface potential V=4154 [V].

Thus, because the surface charge density $\sigma$ will be higher in the second embodiment even if voltage were to be made the same as at the first embodiment, and because the vacuum portion in the second embodiment is devoid of any medium such as would allow a compressional wave to propagate therethrough, the second embodiment will permit achievement of better soundproofing capability. Furthermore, because gap layer 70 of the second embodiment is a vacuum layer, this will also make it possible to suppress heat convection and conduction and make it possible to achieve good thermal insulation functionality.

In particular, in accordance with the present embodiment, there being no need to install spacers or other such core materials within gap layer 70, a repulsive force which is a Coulomb force being used to maintain the vacuum layer, achievement of a simple structure is made possible; and moreover, as there is no conduction of heat by way of core material, achievement of good thermal insulation capability is made possible.

Next, an exemplary method for manufacturing soundproof thermal insulation material 2 of the present embodiment will be described. First, first electrically conductive ferromagnetic layer 50 is affixed to and laminated with the outer side of first charged insulator layer 60, and second electrically conductive ferromagnetic layer 90 is affixed to and laminated with the outer side of second charged insulator layer 80, to form first plate 100 and second plate 200.

With charged sites 62, 82 facing the interior, first plate 100 and second plate 200 are layered together so as straddle spacer frame 71 therebetween. Here, because gap layer 70 formed by spacer frame 71 is to be a vacuum layer, the procedures whereby circular charged regions 63, 83 are charged and the layers are laminated together are carried out in a vacuum chamber.

Following lamination of layers, the gap layer 70 formed by spacer frame 71 is sealed. Seal frame 95 is then installed to manufacture soundproof thermal insulation material 2.

As described above, soundproof thermal insulation material 2 associated with the second embodiment is such that vibration produced by a sound incident thereon alters the magnetic field at electrically conductive ferromagnetic layers 50, 90 and causes generation of core losses, as a result of which the vibration is converted into Joule heat, permitting achievement of a soundproofing functionality which causes reduction in the magnitude of the acoustic energy. Moreover, as soundproof thermal insulation material 2 is such that gap layer 70 is a vacuum layer, it is possible to achieve good thermal insulation functionality.

While embodiments of the present invention have been described above, modes of carrying out the present invention are not limited to the foregoing embodiments, a great many variations being possible without departing from the gist of the present invention. For example, the shapes, sizes, materials, and so forth of the respective parts that make up the soundproof material and/or soundproof thermal insulation material may be varied as appropriate.

Furthermore, the charged configuration at the charged insulators, i.e., the shape, size, arrayed configuration, arrayed pitch, and so forth of the charged regions, may also be varied as appropriate. Note, however, that to prevent nonuniformity of charge, it is preferred that the shape of the charged regions be circular, elliptical, or in the shape of regular polygon(s). Note that where charged regions are of shape other than circular, the dimensions given above for exemplary diameter and pitch should be understood to apply to the widest dimension thereof.

Furthermore, the charged insulators may be negatively charged. Furthermore, the charging method is not limited to ion implantation, it being possible to employ triboelectric charging, charging by means of peeling apart, charging by means of induction, charging by means of polarization, coating of an insulator with a charged body, and/or any other charging method as appropriate.

EXPLANATION OF REFERENCE NUMERALS

1 Soundproof material
10 First electrically conductive ferromagnetic layer
15 First gap layer
20 Charged insulator layer
21 First insulator layer
22 First charged site
23 Circular charged area
25 Second insulator layer
30 Second gap layer
35 Second electrically conductive ferromagnetic layer
40 Seal frame
2 Soundproof thermal insulation material
50 First electrically conductive ferromagnetic layer
51 Perimeter groove
60 First charged insulator layer
61 First insulator layer 62 First charged site
63 Circular charged region
70 Gap layer (vacuum layer)
71 Spacer frame
80 Second charged insulator layer
81 Second insulator layer
82 Second charged site
83 Circular charged region
90 Second electrically conductive ferromagnetic layer
91 Perimeter groove
95 Seal frame
100 First plate
200 Second plate

What is claimed is:

1. A soundproof material comprising, in order:
a first electrically conductive ferromagnetic layer;
a charged insulator layer; and
a second electrically conductive ferromagnetic layer;
wherein a charged site at the charged insulator layer is electrically insulated from the first electrically conductive ferromagnetic layer and the second electrically conductive ferromagnetic layer; and
wherein vibration, due to a sound wave, of any among the first electrically conductive ferromagnetic layer, the charged insulator layer, and the second electrically conductive ferromagnetic layer causes alteration of a magnetic field at the first electrically conductive ferromagnetic layer and the second electrically conductive ferromagnetic layer, soundproofing being carried out when acoustic energy of the sound wave is lost as thermal energy.

2. The soundproof material according to claim 1 wherein the charged insulator layer is electrostatically and magnetically shielded by the first electrically conductive ferromagnetic layer and the second electrically conductive ferromagnetic layer.

3. The soundproof material according to claim 1
wherein a first gap layer is formed between the first electrically conductive ferromagnetic layer and the charged insulator layer;
wherein a second gap layer is formed between the charged insulator layer and the second electrically conductive ferromagnetic layer; and
wherein the first electrically conductive ferromagnetic layer and the second electrically conductive ferromagnetic layer are respectively capable of engaging in motion relative to the charged insulator layer.

4. The soundproof material according to claim 3 wherein the first gap layer and the second gap layer each comprise silicone.

5. The soundproof material according to claim 1
wherein the charged insulator layer comprises
a first charged insulator layer which is provided in integral fashion with the first electrically conductive ferromagnetic layer, and
a second charged insulator layer which is provided in integral fashion with the second electrically conductive ferromagnetic layer;
wherein the first charged insulator layer and the second charged insulator layer are arranged in mutually opposed fashion so as to straddle therebetween a third gap layer which is a vacuum layer; and
wherein a repulsive force which is a Coulomb force acts between the first charged insulator layer and the second charged insulator layer so as to balance ambient atmospheric pressure.

6. The soundproof material according to claim 2
wherein a first gap layer is formed between the first electrically conductive ferromagnetic layer and the charged insulator layer;
wherein a second gap layer is formed between the charged insulator layer and the second electrically conductive ferromagnetic layer; and
wherein the first electrically conductive ferromagnetic layer and the second electrically conductive ferromagnetic layer are respectively capable of engaging in motion relative to the charged insulator layer.

7. The soundproof material according to claim 6 wherein the first gap layer and the second gap layer each comprise silicone.

8. The soundproof material according to claim 2
wherein the charged insulator layer comprises
a first charged insulator layer which is provided in integral fashion with the first electrically conductive ferromagnetic layer, and
a second charged insulator layer which is provided in integral fashion with the second electrically conductive ferromagnetic layer;
wherein the first charged insulator layer and the second charged insulator layer are arranged in mutually opposed fashion so as to straddle therebetween a third gap layer which is a vacuum layer; and
wherein a repulsive force which is a Coulomb force acts between the first charged insulator layer and the second charged insulator layer so as to balance ambient atmospheric pressure.

9. The soundproof material according to claim 4 wherein at least one of the first gap layer and the second gap layer comprises silicone gel.

10. The soundproof material according to claim 4 wherein at least one of the first gap layer and the second gap layer comprises silicone rubber.

11. The soundproof material according to claim 7 wherein at least one of the first gap layer and the second gap layer comprises silicone gel.

12. The soundproof material according to claim 7 wherein at least one of the first gap layer and the second gap layer comprises silicone rubber.

13. The soundproof material according to claim 5 wherein a multiplicity of charged regions are arrayed in regular and orderly fashion at at least one of the first charged insulator layer and the second charged insulator layer.

14. The soundproof material according to claim 13 wherein the regular and orderly arrayal of charged regions constitutes a rectangular lattice-like arrangement, and the charged regions are each substantially 4 mm in size at their widest dimension with a pitch of substantially 5 mm therebetween.

15. The soundproof material according to claim 13 wherein the regular and orderly arrayal of charged regions constitutes an equilateral-triangle-lattice-like arrangement, and the charged regions are each substantially 2 mm in size at their widest dimension with a pitch of substantially 2.5 mm therebetween.

16. The soundproof material according to claim 8 wherein a multiplicity of charged regions are arrayed in regular and orderly fashion at at least one of the first charged insulator layer and the second charged insulator layer.

17. The soundproof material according to claim 16 wherein the regular and orderly arrayal of charged regions constitutes a rectangular lattice-like arrangement, and the charged regions are each substantially 4 mm in size at their widest dimension with a pitch of substantially 5 mm therebetween.

18. The soundproof material according to claim 16 wherein the regular and orderly arrayal of charged regions constitutes an equilateral-triangle-lattice-like arrangement, and the charged regions are each substantially 2 mm in size at their widest dimension with a pitch of substantially 2.5 mm therebetween.

19. The soundproof material according to claim 5 wherein at least one perimeter groove is formed on an inner surface at a perimeter of at least one of the first electrically conductive ferromagnetic layer and the second electrically conductive ferromagnetic layer so as to prevent physical contact with at least one of the first charged insulator layer and the second charged insulator layer.

20. The soundproof material according to claim 8 wherein at least one perimeter groove is formed on an inner surface at a perimeter of at least one of the first electrically conductive ferromagnetic layer and the second electrically conductive ferromagnetic layer so as to prevent physical contact with at least one of the first charged insulator layer and the second charged insulator layer.

\* \* \* \* \*